United States Patent [19]

Pitha

[11] Patent Number: 5,935,941
[45] Date of Patent: Aug. 10, 1999

[54] ALKYLATIONS OF CYCLODEXTRINS LEADING TO DERIVATIVES WHICH HAVE A RIDGIDLY EXTENDED CAVITY

[76] Inventor: Josef Pitha, 417 Anglesea St., Baltimore, Md. 21224

[21] Appl. No.: 08/957,359

[22] Filed: Oct. 24, 1997

[51] Int. Cl.[6] .......................... A61K 31/715; C08B 37/16
[52] U.S. Cl. ........................... 514/58; 536/18.6; 536/103; 536/124
[58] Field of Search ............................. 514/58; 536/103, 536/18.6, 124

[56] References Cited

U.S. PATENT DOCUMENTS

| | | | |
|---|---|---|---|
| 4,764,604 | 8/1988 | Muller | 536/103 |
| 4,870,060 | 9/1989 | Muller | 514/58 |
| 5,096,893 | 3/1992 | Pitha et al. | 514/58 |
| 5,710,268 | 1/1998 | Wimmer | 536/103 |

FOREIGN PATENT DOCUMENTS 646602  4/1995  Germany .

OTHER PUBLICATIONS

Remington, "Pharmaceutical Sciences" 15th Mack Publishing Company, Easton, PA; p. 230, 1975.
Rao et al., "Substitution in β–cyclodextrin Directed by Basicity: Preparation of 2–0–and 6–0–[(R) –and (S)–2–Hydroxypropyl] Derivatives," *J. Org. Chem.*, 1991, 56, pp. 1327–1329.

*Primary Examiner*—Robert W. Ramsuer
*Assistant Examiner*—Jane C. Oswecki
*Attorney, Agent, or Firm*—Glenna Hendricks

[57] ABSTRACT

By controlling basicity of the reaction, is possible to alkylate preferentially the secondary hydroxyls of cyclodextrins. These hydroxyls surround the principal, wide, entry into the cyclodextrin cavity and, thus, their substitution by suitably chosen substituents can improve the formation of inclusion complexes. By methods of the invention, cyclodextrin derivatives substituted with fused 1,4-dioxane ring(s) can be obtained. If a reagent with one alkylating moiety is used, a mixture of ethers of cyclodextrin is formed. Using methods of this invention, up to 96% of the substitution can be directed to the secondary hydroxyls.

19 Claims, No Drawings

ALKYLATIONS OF CYCLODEXTRINS LEADING TO DERIVATIVES WHICH HAVE A RIDGIDLY EXTENDED CAVITY

FIELD OF THE INVENTION

This invention relates to cyclodextrins which are water soluble oligosaccharides with molecules which have toroidal cavities into which molecules of water insoluble compounds can be included and, thus, solubilized. This invention also relates to a one-step preparation of cyclodextrin derivatives in which the majority of the substituents surround the principal entry to the cavity. These substituents can be chosen to be non-polar and rigid (as the cavity itself) and, thus, they can make the cavity longer. Alternatively, ionic substituents can be introduced and the resulting electric charge localized at the principal entry to the cavity used to modify its character. The compositions of the present invention make it possible to solubilize and stabilize a larger variety of compounds.

BACKGROUND OF THE INVENTION

For solubilization of non-polar compounds, either organic solvents or detergents are routinely used. Water soluble compounds with molecules forming a cavity into which non-polar compounds can be included can be used instead of solvents and detergents; cyclodextrins are an example of such compounds.

Cyclodextrins are a group of cyclic oligosaccharides in which glucopyranosyl residues are joined by alpha (1 to 4) glycoside linkages. Three cyclodextrins are of particular interest: alpha-, beta- and gamma-. They have, respectively, six, seven or eight glucopyranosyl residues. Since each of the glucopyranosyl residues has two secondary hydroxyls (located at the principal, wide, entry to the cavity) and one primary hydroxyl (located on the narrow opening of the cavity), alpha-, beta- and gamma-cyclodextrins have, respectively, 18, 21 or 24 hydroxyls, any of which can be alkylated.

Previous art related to epichlorohydrin:

Reactions of cyclodextrins with epichlorohydrin have been repeatedly investigated. Wiedenhof et al. (Starke, Vol. 21, pp. 119–123 (1969)) summarized the initial results. Cyclodextrin and epichlorohydrin were condensed in concentrated aqueous solutions with a strong base (e.g., 10% sodium hydroxide) and, depending on conditions, water soluble or water insoluble products were obtained. These products were called by Wiedenhof, et al. and others water soluble polymers or E-resins to denote that their molecules contain multiple cyclodextrin residues joined together by residues derived from epichlorohydrin. Wiedenhof et al. identified correctly these and other epichlorohydrin derived residues attached to cyclodextrins; dihydroxypropyl ether groups were one of the epichlorohydrin residues Wiedenhof et al. identified.

The matter was re-investigated by Fenyvesi et al. (communicated as a lecture in October 1981 and published subsequently in *Proceedings of the First International Symposium on Cyclodextrins,* D. Reidel Publishing Company, Dordrecht, Holland, 1982, pp. 345–356). Fenyvesi et al. found that products previous investigators called water soluble polymers are not really polymers. Fenyvesi et al. described seven different preparations made from beta-cyclodextrin and epichlorohydrin. Their data show that these preparations contained compounds with just one cyclodextrin per molecule (i.e., were partial dihydroxypropyl ethers of cyclodextrins). Their preparations also contained compounds which had just a few cyclodextrin residues per molecule (in further discussion we refer to these as oligomers). Nevertheless, through power of precedent, Fenyvesi et al. continued to use the term "polymer" for their products and this name has remained in use to present.

Fenyvesi et al., furthermore, tested and found the products made from beta-cyclodextrin and epichlorhydrin form inclusion complexes (and solubilize) compounds which according to Remington's Pharmaceutical Sciences ($_{15}$th edition, Mack Publishing Company, Easton, Pa., 1975) have direct uses in pharmaceutics. Fenyvesi et al. described pharmaceutical formulations of indomethacin (analgesic and anti-pyretic agent), benzoic acid (antifungal agent), cholic acid (digestant) and anethole (flavoring agent). Fenyvesi et al. did not unequivocally specify which of their preparation were used in these experiments, but gave full characterization of all of their preparations, from which the minimal concentration of partial dihydroxypropyl ethers of beta-cyclodextrin in these preparations can be calculated. Fenyvesi et al. taught that the mixtures contained molecules of molecular weight ranging from 1200 to 10,000 daltons. The pharmaceutical formulations made by Fenyvesi et al. had the form of aqueous solutions and previous art establishes that further ingredients can be added to solutions of inclusion complexes, or these solutions can be freeze dried, without complications.

At a later time, European Patent 0 149 197 Bl was awarded to Brauns and Muller claiming pharmaceutical formulations which encompass the teachings of Fenyvesi containing inclusion complexes of medicinal substances with "partially etherified cyclodextrin, the ether substituent of which are ... or dihydroxypropyl groups." The partially etherified beta-cyclodextrin, the ether substituent of which are ". . . dihydroxypropyl groups" is just a chemically synonymous name to the "cyclodextrin-glycerol-ether" of Fenyvesi et al. European Patent 0 149 197 Bl does not teach the preparation or describe any particular use of the di-hydroxypropyl ethers of cyclodextrins and does not address the previous art of Fenyvesi, et al.

Some aspects of the present invention are to be considered novel extensions of previous art by Fenyvesi et al., both with respect to preparation and uses employing new conditions of controlled basicity at minimal effective level in the reaction mixture, the products containing mainly molecules with just one cyclodextrin unit can be made and these possess new structural elements. Nevertheless, analysis of prior art shows that pharmaceutical uses of compositions of matter of this invention are not covered by description or claims in European Patent 0 149 197 Bl. European Patent 0 149 197 Bl and the earlier art of Fenyvesi et al neither describe how to make or use the instant invention. (It should be noted that while the patent claim specifically encompasses dihydroxypropyl cyclodextrins of Fenyvesi.) Specifically, Fenyvesi described pharmaceutical formulations containing inclusions complexes of medicinals with cyclodextrin derivatives of which 87% or less were "cyclodextrin-glycerol-ethers" which had just one cyclodextrin residue per molecule or dihydroxypropyl ethers of cyclodextrins by another name. The concentrations of dihydroxypropyl ethers of cyclodextrins in the materials described in the present invention are lower than those in the materials of Fenyvesi et al. The inclusions complexes containing medicinals with the derivatives of cyclodextrins described herein are neither disclosed nor claimed in European patent 0 149 197 B1.

Previous art related to vicinal dihalides:

No records of a reaction of cyclodextrins with 1,2-dichloroethane, 1,2-dichloropropane, or their congeners were found.

Previous art related to methylation:

This reaction was a subject of many investigations. Chemically individual methyl derivatives of cyclodextrins were prepared either by a several step synthesis or without control of basicity during the reaction. The preparation of randomly methylated cyclodextrin derivatives, well suited for solubilization of non-polar compounds, was described in a European patent publication 0 646 602 Al; this patent publication also analyzed related previous art. This publication claims methods of reacting cyclodextrins with alkylating agents by a method wherein the cyclodextrins are dissolved in a fraction of the total base used and, thereafter, the alkylating agent and the remaining base are added. The novel process disclosed and claimed herein differs from the present invention in that under previous methods the basicity of the reaction mixture was essentially uncontrolled. Consequently, the type of distribution between the secondary and primary hydroxyls is quite different from the distributions obtained by the method of the present invention. Methods described in European patent publication 0 646 602 Al produce up to 62% of methyl groups on secondary hydroxyls. Methods of other previous art analyzed in the same publication introduce up to 52% of methyls to secondary hydroxyls.

Previous art related to alkylation by other reagents with one alkylating group:

In the previously described reactions of this type, the basicity of the reaction was neither controlled nor kept at its minimal effective level. For example, in alkylation of beta-cyclodextrins with sultones described in U.S. Pat. No. 5,134,127, the concentration of sodium hydroxide in the reaction mixtures was recommended to be, "set at a level higher than 10% (wt/wt), preferably in the range of 40–60% (wt/wt)." Products of the alkylation performed at such high basicity contained some starting cyclodextrin, which had to be removed by purification. When basicity of the reaction mixture is kept constant and at minimal effective level, as described in this invention, products without contaminating starting cyclodextrins can be obtained.

SUMMARY OF THE INVENTION

It is the purpose of this invention to provide new cyclodextrin derivatives of enhanced usefulness. Using the method of the invention, it is possible to alkylate preferentially the secondary hydroxyls of cyclodextrins. These hydroxyls surround the principal, wide, entry into the cyclodextrin cavity and, thus, their substitution by suitably chosen substituents can improve the formation of inclusion complexes.

The structural element of a 1,4-dioxane ring fused to a glucose residue is new in the field of cyclodextrin derivatives. This structural element was previously recorded only by Holmberg et al. (*Carbohydrate Research,* Vol. 272, pp 203–211, 1995) in Sephadex G25, which is a water insoluble resin formed from dextran (a polysaccharide structurally very different from cyclodextrins) and epichlorohydrin.

It has, furthermore, been found that if a reagent with one alkylating moiety is used, a mixture of ethers of cyclodextrin is formed. Using methods of this invention, up to 96% of the substitution can be directed to the secondary hydroxyls.

If a reagent with two alkylating moieties is used (e.g., 1,2-dichloroethane), the initially formed monoether of cyclodextrin still has the second alkylating moiety located in the substituent. This may react in one of three ways:

1. The second alkylating moiety is hydrolyzed, leading to hydroxyalkyl or dihydroxyalkyl substituent.
2. The second alkylating moiety can alkylate another cyclodextrin and, thus, two cyclodextrins become linked together. This process can be called intermolecular crosslinking and eventually may lead to true polymers or resins.
3. The second alkylating moiety can alkylate another hydroxyl of the same cyclodextrin. This is intramolecular crosslinking and is a pathway favored by low basicity of reaction mixtures, by low concentrations of reagent and of cyclodextrin, and by increased temperature. If intramolecular crosslinking occurs between two secondary hydroxyls on the same glucopyranosyl residue, a new six member 1,4-dioxane ring is formed which is fused to the glucopyranosyl residue. Alternatively, such structures can be called cyclic diether groups.

The following is an example of reactions which occur using the methods of the invention:

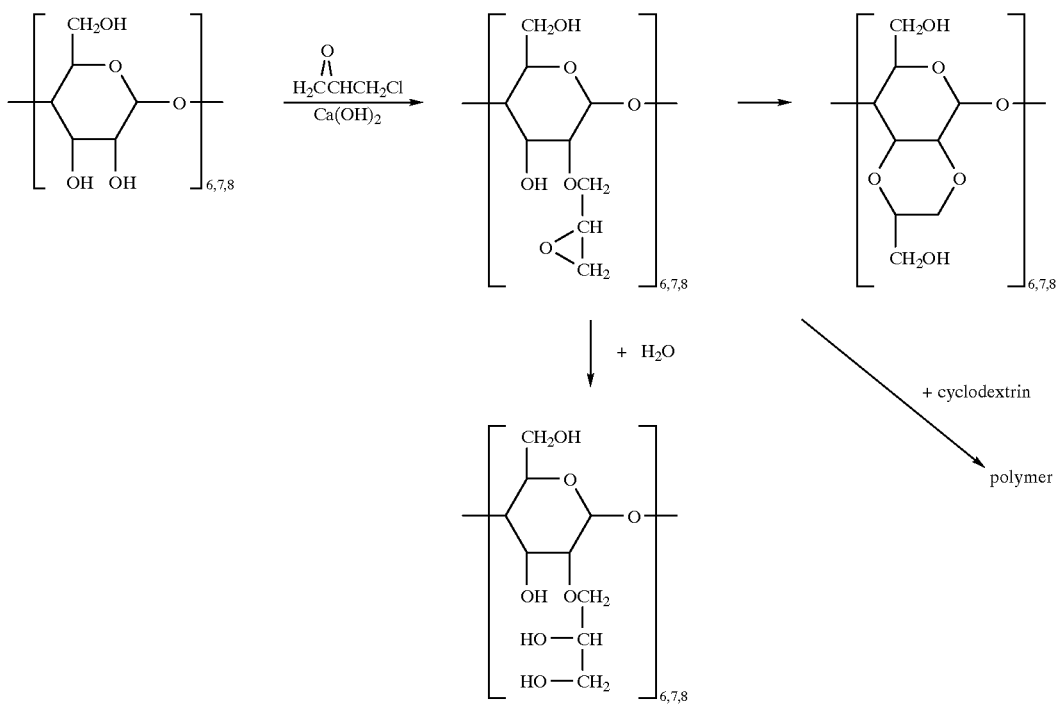

Reaction products include compounds of the formula:

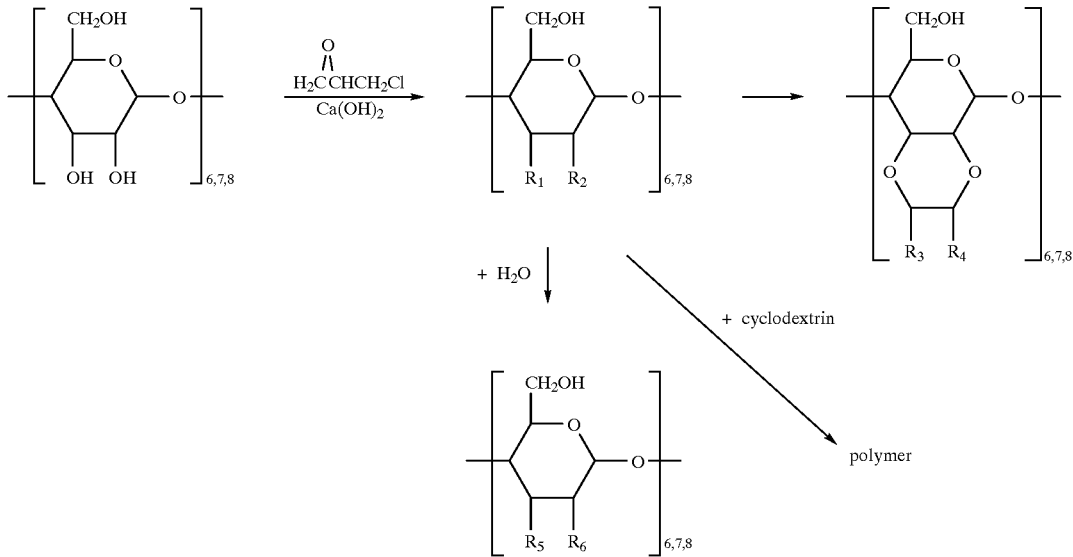

wherein $R_1$ and $R_2$ may be OH,

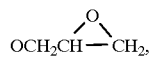

with the proviso that at one of $R_1$ or $R_2$ is OH, $R_3$, $R_4$, $R_5$ and $R_6$ may be H, alkyl, mono- or dihydroxy substituted alkyl and wherein there may exist two substituents replacing hydrogens at $R_3$ and $R_4$.

By methods of the invention, and using reagents with two alkylating moieties, it is possible to obtain compositions in which less than 30% of the material has molecules containing two or more cyclodextrin units. Methods of this invention make it possible to obtain compositions in which up to 98% of the substituents are located on secondary hydroxyls and up to 75% theoretically possible intramolecular crosslinking actually occurs.

DETAILED DESCRIPTION OF THE INVENTION

The novel invention described herein enables a one-step alkylation of the secondary hydroxyls and, thus, will improve potency of water-soluble derivatives of cyclodextrins to solubilize non-polar compounds into polar solutions. The same chemical modification can also be used in preparation of water insoluble derivatives of cyclodextrins for selective absorption of non-polar compounds from polar solutions.

For purposes of this description, the term "alkylating reagent" is understood to mean a reagent which in the course of its reaction, termed "alkylation," liberates a strong acid. For example, alkylation of cyclodextrin with epichlorohydrin is accompanied by the release of hydrochloric acid. Furthermore, products described here are to be understood to be mixtures of many chemically individual compounds; thus, a substance called diethylaminoethyl beta-cyclodextrin is a mixture of many compounds in which various hydroxyls of beta-cyclodextrin were substituted by diethylaminoethyl groups.

New structural elements which can be termed either cyclodextrin derivatives with 1,4-dioxane rings fused to glucose residues, or cyclic diethers formed from epichlorohydrin and cyclodextrin, or cyclodextrins in which their secondary hydroxyls are linked by —$CH_2$—$CH(CH_2OH)$— groups are made my means described herein. Other groups present in the products described in this invention are identical to those observed by Wiedenhof et al. and by Fenyvesi. Furthermore, some of the components of the Wiedenhof et al. and of Fenyvesi et al. mixtures can be found in our mixtures as well.

By the novel methods of the invention, controlled alkylation of cyclodextrins is performed in media having a minimal basicity to sustain a reasonable reaction rate. The alkylation of cyclodextrins occurs at reasonable rates only when the basicity of the reaction mixture is sufficient to cause cyclodextrins to begin to dissociate to cyclodextrin anions. Thereafter, the rapid alkylation of these anions proceeds. Hydrolysis of alkylating reagents (which invariably occurs in aqueous media and wastes the reagent) also occurs as a result of alkylation of hydroxide anions and, thus, requires basic conditions. Since cyclodextrins are dissociated to anions more easily (pKa 12.3, 12.2 and 12.1 for alpha-, beta- and gamma- cyclodextrins were measured by Gelb et al., Bioorganic Chemistry, Vol. 11, pp. 274–280, 1982) than water (pKa 15.7), an appropriate choice of basicity may diminish this waste. Furthermore, use of minimal basicity makes it possible to control alkylations in order to obtain specific products of the reaction. Gelb et al. suggests that anions of cyclodextrins are formed mainly through ionization of the secondary hydroxyls. Some of the alkylations routinely used on cyclodextrins introduce substituents containing new hydroxy groups (for example 3-hydroxypropyl) which themselves can be alkylated as the reaction proceeds. Keeping the basicity at minimal effective level can diminish even this side reaction, since acidity of non-activated alcohols (pKa values 15.9–18) is lower than that of cyclodextrins.

Methods to control basicity at minimal effective level:

One method of minimizing basicity in the reaction mixtures in which cyclodextrin alkylation occurs is by monitoring of pH and by adding the base to the mixture gradually, as it is consumed. Usually, this method will prevent basicity of the reaction mixture from rising to a pH above 13.5. A second method depends on the use of bases of limited solubility. Calcium hydroxide dissolves at room temperature only to the concentration of 0.022 M (pH 12.4) and at 100° C. to the concentration of 0.009 M. The basicity obtained using this reagent was satisfactory to keep rates of alkylations of cyclodextrins in an acceptable range. When calcium hydroxide is used, the processes are occasionally complicated by formation of gels. Thus, for example, at room temperature a gel was formed upon addition of calcium hydroxide to the solution of gamma-cyclodextrin and this gel was stiff enough to prevent stirring. Alkylation of this gel, nevertheless, could be performed in a ball mill and liquefaction occurred within an hour of rotation when epichlorohydrin was used. The formation of the gel could be completely prevented by an increase in temperature and the alkylation could then be performed using a magnet-driven stirrer. When alpha-cyclodextrin was used, formation of similar gels was observed only when concentrated solutions were used. With beta-cyclodextrin, the formation of gels was not observed.

Alternative methods to use of calcium hydroxide were tested. One involved precipitation of calcium or magnesium hydroxide in situ by a gradual addition of sodium hydroxide to an assembled reaction mixture containing cyclodextrin, alkylating agent, and water soluble calcium or magnesium salts. These modifications were found to work, but no clear advantage over the use of calcium hydroxide was detected.

In another method, the basicity of reaction mixtures was regulated using the buffering capacity of alkali aluminates, zincates or silicates. These salts are soluble in aqueous media and act as pH buffering agents. When the pH of the mixtures decreases, hydrated oxides precipitate.

Alkylating Reagents and Products Presented in Examples:

Use of the principle of minimal effective basicity level in alkylations of alpha-, beta- and gamma-cyclodextrin with epichlorohydrin is described in Examples 1–8. In Examples 1–4, calcium hydroxide was used as a base and the reaction was performed at reflux temperature. In Example 1, conditions were chosen to lead to a product which can be easily characterized. Formation of species containing more than one cyclodextrin was suppressed to a level barely detectable in mass spectra. All species, but one, seen in mass spectra could be unequivocally attributed; consequently, the degree to which intramolecular crosslinking occurred could be determined and was found to be about 50%. The product was further subjected to alditol acetate analysis, which can distinguish the substitution pattern in greater detail. That revealed that about 97% of all substitution occurred on the secondary hydroxyls and about half of all possible intramolecular crosslinks were formed.

In Examples 2–4, larger amounts of epichlorohydrin were used leading to an increased degree of substitution and to a higher proportion of species containing more than one cyclodextrin residue per molecule. Gamma-cyclodextrin was condensed in Example 2; beta- and alpha- cyclodextrins were condensed in Examples 3 and 4, respectively. Example 5 delineates condensation of epichlorohydrin with gamma-cyclodextrin at room temperature, when the latter forms a gel with calcium hydroxide and water.

The first step in reaction of epichlorohydrin with anions of alcohols or carbohydrates, is known to be opening of epoxide ring. The results in Examples 1–4, thus, clearly show that the basicity obtained by calcium hydroxide in water is satisfactory to catalyze the condensation of cyclodextrins with epichlorohydrin, which is chloropropylene oxide, and will be satisfactory for condensations with ethylene oxide or propylene oxide as well. The latter two reagents do not release an acid upon reaction. Catalysis by calcium hydroxide has an operative advantage over the catalysis by sodium or potassium hydroxide which is usually used for this purpose: calcium hydroxide can be fully removed simply by saturation of solutions with carbon dioxide and filtering off calcium carbonate (as described in Example 1). Processes of dialysis or of ion exchange, which complicate production of hydroxypropyl cyclodextrins, can thus be avoided.

Examples 6 and 7 established that cyclodextrin derivatives containing the intramolecular crosslinks can be obtained even when sodium hydroxide is used as a base. Furthermore, these experiments established that a gradual addition of sodium hydroxide to an emulsion of epichlorohydrin in aqueous solution of cyclodextrin leads to a better utilization of epichlorohydrin than that obtained when the usual sequence is used (i.e., in when epichlorohydrin is added to an alkaline solution of cyclodextrin).

In Example 8, the principle of minimal effective basicity level was obtained using sodium hydroxide solutions, the basicity of which was lowered by addition of magnesium, calcium, aluminum or zinc salts, or by addition of silicic acid.

In examples 9–12, 1,2-dichloroethane was used to alkylate gamma-, beta- or alpha-cyclodextrin. The reaction was performed at atmospheric pressure (Examples 9–11) or in a pressure vessel (Example 12). Analysis by mass spectra and by the alditol acetate method show that these alkylations are quite specific. In Example 12, 98% of all substitution occurred on the secondary hydroxyls. Formation of intramolecular crosslinks occurred with even better yields (75%) than when epichlorohydrin was used.

Example 13 documents that reactions of the same type occur when 1,2-dihaloethane is replaced by 1,2-dihalopropane. Example 14 documents that in preparations described in Example 11 organic solvent can replace water.

In Example 15, methyl iodide was used as an alkylating agent and analysis of the product established that the principle of minimal effective basicity leads to high specificity; in the case of gamma-cyclodextrin about 96% of substituents were directed to secondary hydroxyls. Similar results were obtained in methylation of beta-cyclodextrin. It should be noted that a number of pure methyl ethers of cyclodextrins are known and all of them are crystalline. Takeo et al. (*Starke*, Vol. 28, pp. 226–227, 1976) and Takeo et al. (*Carbohydrate Research*, Vol. 187, pp. 203–221, 1989) described crystalline hexakis-2-O-methyl-alpha-cyclodextrin, hexakis-3-O-methyl-alpha-cyclodextrin, heptakis-2-O-methyl-beta-cyclodextrin, heptakis-2-O-methyl-beta-cyclodextrin, heptakis-2,3-O-dimethyl-beta-cyclodextrin and octakis-2,3-O-dimethyl-gamma-cyclodextrin. Jindrich et al. (*Carbohydrate Research*, Vol. 266, pp. 75–80, 1995) described a crystalline 2-O-methyl-beta-cyclodextrin. The latter was easily isolated from the appropriate products described in Example 15; some of the dimethyl derivatives isolated from those products also appeared to be crystalline. The presence of heptakis substitued compounds in these products was documented by thin layer chromatography and mass spectrometry. Since these products contain isolable, or potentially isolable, components already know to be crystalline, these mixtures of cyclodextrin derivatives do not belong to the intrinsically amorphous category.

In Example 19, calcium hydroxide was used in preparation of partial acetates of cyclodextrin. Example 20 describes preparation of cyclodextrin derivatives containing intramolecular crosslinks by an acid catalyzed cyclization. Example 21 describes preparation of water insoluble resins containing cyclodextrin carrying the intramolecular crosslinks.

Example 22 delineates uses of the above products. Products of condensation of epichlorohydrin with cyclodextrins were found well suited for solubilization of a series of medicinal agents of low water solubility. Results were about comparable to those obtained with hydroxypropyl cyclodextrin. The same products also were used to stabilize solutions of a peptide (insulin). The results there were superior to those obtained with hydroxypropyl cyclodextrin. Results obtained with the same derivatives on irritancy to skin, eye and upon subcutaneous injection testify further to potential pharmaceutical uses of these compounds.

Methods used in the identification of products:

For the initial characterization and mutual comparison of the products, thin layer chromatography was used. This was performed on precoated silica gel plates using 1-propanol-water-ethyl acetate-ammonium hydroxide (6:3:1:1) as a solvent for the developing process. The substances were revealed as blue spots after briefly dipping the plate into a Vaugh's reagent (a solution of ceric sulfate, 1 g, ammonium molybdate, 24 g, in 10% sulfuric acid, 500 ml). This system effectively separates members of series in which the total number of substituents increases (that is starting compound from monosubstituted, disubstituted and so on); polymers of cyclodextrins in this system have Rf values close to zero.

Distribution of molecular weight and determination of the type of substituents present were obtained from mass spectra. Only those regions of the spectra in which peaks of molecular ions appear were analyzed and, unless otherwise stated, peaks had to comprise more than 15% of the most intensive peak in the region (base peak) to be counted. Unless otherwise stated, measurements and evaluations were limited to molecular ion regions of species containing only one cyclodextrin residue. Mass spectra were measured either in FAB or MALDI modes and m/z are given as measured. FAB mode was used in conjunction with glycerol-trifluoroacetic acid matrix which yields ions $(M+H)^+$. MALDI mode yields predominantly $(M+Na)^+$ ions and, for calculations, molecular weights m/z values had to be corrected for the mass of sodium. Relative intensities of peaks are expressed as percentages of the sum of the intensities of various molecular ions of the respective regions.

While practically all the peaks found in molecular ion regions of spectra of the products could be attributed to some of the expected compound, not all attributions could be made unequivocally. At higher substitutions, certain species have very close m/z values. For example, gamma-cyclodextrin substituted with three glycerol monoether ether groups has m/z 1519 and that substituted with four glycerol cyclic diether groups has m/z 1521. Consequently, both these components may contribute to the same peak and unequivocal attributions can not be made. To compare how various conditions favor formation of cyclic diether, a "cycle favoring ratio" is given in which intensities of peaks of species differing by just one ring closure are compared.

Ultimately, some of the products were subjected to alditol acetate analysis. In this specialized procedure, the sample is at first permethylated (except when methyl derivatives of cyclodextrins are analyzed, this step is omitted), then hydrolyzed to monosaccharide level, reduced and peracetylated. The mixture of alditol acetates obtained is then analyzed using GC-MS and GC-flame detector instruments. The results of this analysis are expressed in mole percent.

EXAMPLE 1

Alkylation by epichlorohydrin of gamma-cyclodextrin in refluxing suspension of calcium hydroxide resulting in low degree of substitution:

Gamma-cyclodextrin (10 g of hydrate, about 55 mmoles of glucopyranosyl residue) was dissolved in water (200 ml), contained in an Erlenmayer flask equipped with reflux condenser and placed on a heater-magnetic stirrer plate. While stirring, calcium hydroxide (2.32 g, about 31 mmoles) was rapidly added and heating started. A transient thickening of the suspension through gel formation was observed, but the gel completely dissociated as temperature increased and the mixture could be stirred by a magnetic stirrer. When the reflux temperature was reached, epichlorohydrin (4.4 ml, 56 mmoles) was added dropwise in 10 minutes through the reflux condenser. Stirring and heating were continued for another 75 minutes; at this point, no epichlorohydrin was detectable in the sample of the condensate. The volume was then reduced by distilling off about half of the water. The reaction mixture was left to cool to room temperature and saturated by gaseous carbon dioxide until its pH dropped from a strongly basic to neutral-slightly acidic. The suspension was then briefly boiled (to decompose calcium bicarbonate) and, after a couple of hours of standing, the sediment of calcium carbonate was filtered off easily. The clear filtrate was then dialyzed against tap water. To remove the remaining traces of calcium chloride, an aqueous solution of sodium carbonate was gradually added until no more precipitate was formed. After a few hours of standing, the sediment of calcium carbonate was filtered off and the clear filtrate desalted by ion exchange resin. The solution was then evaporated in vacuo to dryness. The glassy residue was scraped from the evaporating flask and ground to a white powder (7.656 g). The product dissolved rapidly in water up to 40% (wt/wt); the resulting solutions were stable upon standing. If the contaminating calcium chloride was not completely removed, the product was strongly hygroscopic and its solution precipitated upon standing.

Upon chromatography analysis, the product formed a continuous spot with Rf 0.12–0.56 with stronger coloration at Rf 0.43, 0.36 and 0.31; gamma-cyclodextrin under the same condition had Rf 0.29.

Upon mass spectrometry analysis performed in MALDI mode, the following peaks were observed: m/z 1387, 6%, (one glycerol cyclic diether group); m/z 1395, 3%, (one glycerol monoether group); m/z 1433, 14%, (two glycerol cyclic diether groups); m/z 1451, 13%, (one glycerol cyclic diether group and one glycerol monoether group); m/z 1470, 3%, (two glycerol monoether groups); m/z 1490, 9%, (three glycerol cyclic diether groups): m/z 1507, 16%, (two glycerol cyclic diether groups and one glycerol monoether group); m/z 1525, 9%, (one glycerol cyclic diether group and two glycerol monoether groups); m/z 1545, 3%, (four glycerol cyclic diether groups); m/z 1563, 7%, (three glycerol cyclic diether groups and one glycerol monoether group); m/z 1581, 8%, (two glycerol cyclic diether groups and two glycerol monoether groups); m/z 1600, 3%, (one glycerol cyclic diether group and three glycerol monoether groups); m/z 1638, 2%, (three glycerol cyclic diether groups and two glycerol monoether groups); m/z 1655, 2%, (equivocal attribution).

From the above data, an average molecular weight was calculated to be 1444. Only the last peak could not be unambiguously attributed to a single species containing stated structural elements. If this peak is not counted, the product contains 2.0 substituents per molecule and, from these substituents, 61% (by number) contain fused 1,4 dioxane groups (i.e., glycerol cyclic diether groups). The peak of gamma-cyclodextrin was less than 5% of the base peak.

In the conditions used in this example, formation of condensation products containing two or more cyclodextrin residues is greatly suppressed. This was established by alkylation of beta-cyclodextrin using the same conditions and mass spectrometry of the product in MALDI mode. All peaks observed in the region of molecular ions of species with two cyclodextrin residues were 2% of the base peak observed in the region of species with only one cyclodextrin residue only.

The alditol acetate analysis also was used to characterize the product of gamma-cyclodextrin condensation above with the following result: Unsubstituted glucose 60%, glucose substituted with a glycerol cyclic diether group 19.9%, glucose substituted with a glycerol monoether substituent: on 0–4.6%, on 0–3 10.9%, on 0–6 1.9%. From these data, one can calculate that an average of 4.6 hydroxyls of gamma-cyclodextrin were substituted; 97% of the substitution occurred on the secondary hydroxyls; 55% of all possible cycles were formed. Product, according to this analysis, had about three substituents per molecule.

EXAMPLE 2

Alkylation by epichlorohydrin of gamma-cyclodextrin in refluxing aqueous suspension of calcium hydroxide; high degree of substitution:

The experiment was performed as described in the Example 1, except that larger amounts of calcium hydroxide (4.63 g, 62 mmoles) and of epichlorohydrin (8.8 ml, 111 mmoles) were used. The product was a very slightly discolored white powder (8.04 g). The slight discoloration of the product is due to the isomerization and condensations of epichloro-hydrin derived compounds formed during the alkaline condensation. The discoloration can be ameliorated by adding a small amount of sodium borohydride to the reaction mixture before adding epichlorohydrin.

Analysis of the product by chromatography revealed that polymeric components were absent. The product formed a continuous spot of Rf from 0.06 to 0.56; gamma-cyclodextrin, under the same conditions, had an Rf 0.29.

When analysis by mass spectrometry was performed in FAB mode, the only peaks which could be unambiguously attributed were: m/z 1466, 2%, three glycerol cyclic diether groups; m/z 1484, 2%, two glycerol cyclic diether groups and one glycerol monoether group; m/z 1503, 1t, one glycerol cyclic diether group and two glycerol monoether groups; m/z 1540, 6%, three glycerol cyclic diether groups and one glycerol monoether group; m/z 1558, 4%, two glycerol cyclic diether groups and two glycerol monoether groups; m/z 1614, 8%, three glycerol cyclic diether groups and two glycerol monoether groups. The spectrum contained additionally 18 peaks (values m/z from 1540 to 1931) which could not be attributed unequivocally. The average molecular weight was calculated to be 1671; gamma-cyclodextrin was not detected. A cycle favoring ratio of 1.02 was calculated using species containing (three glycerol cyclic diether groups and one glycerol monoether group) and (two glycerol cyclic diether groups and two glycerol monoether groups).

For an analysis of the product for species containing one and two cyclodextrin units, a spectrum in MALDI mode was recorded. The analysis of the molecular ion region of components containing one cyclodextrin ring per molecule in this spectrum enabled a comparison of results obtained in FAB and MALDI modes. In MALDI mode, the average molecular weight was 1606 (sodium corrected) compared to the 1671 found by FAB. In MALDI, the base peak $(M+Na)^+$ was at m/z 1637; this was obviously the same component which formed the base peak $(M+H)^+$ of 1614 in the FAB mode described previously. In the region of molecular ions of components containing two cyclodextrin rings, there were 28 peaks, none of which could be attributed unequivocally;

base peak had m/z 3202. From the MALDI data, the average molecular weight of components which contain two cyclodextrin units per molecule was 3348. For 100 molecules of components containing one cyclodextrin ring there are 22 molecules of components containing two cyclodextrin rings. In other words, if the mixture is assumed to consist entirely of components of one or two cyclodextrin rings per molecule, the former represent 68% by weight.

EXAMPLE 3

Alkylation by epichlorohydrin of beta-cyclodextrin in refluxing aqueous suspension of calcium hydroxide; high degree of substitution:

The same procedure as described in Example 2 was used for beta-cyclodextrin and yielded 7.556 g of the product. Chromatographic analysis showed that no polymeric components were present in the product.

From the mass spectrum measured in FAB mode, the average molecular weight was calculated to be 1463; the cycle favoring ratio, calculated using peaks of species carrying (1) three glycerol cyclic diether groups and one glycerol monoether group and (2) two cyclic glycerol diether groups and two glycerol monoether group was 1.42.

EXAMPLE 4

Alkylation by epichlorohydrin of alpha-cyclodextrin in refluxing aqueous suspension of calcium hydroxide; high degree of substitution:

The same procedure as described in Example 2 was used for alpha-cyclodextrin and yielded 7.484 g of the product. Analysis by chromatography documented the absence of polymeric species.

Mass spectrum in FAB mode had the base peak at m/z 1160, the average molecular weight was 1204. The cycle favoring ratio, calculated using species substituted with three glycerol cyclic diether groups and one glycerol monoether group and with two glycerol cyclic diether groups and two glycerol monoether group was 0.79.

EXAMPLE 5

Alkylation by epichlorohydrin of gamma-cyclodextrin after gelling its aqueous solution with calcium hydroxide:

Gamma-cyclodextrin (10 g) was dissolved in water (100 ml) and added to calcium hydroxide (4.63 g, 62.5 mmoles) placed in a container of a ball mill. The resulting suspension transformed into a gel within several minutes. Epichlorohydrin (8.8 ml) and balls of the ball mill were then added and the container was rotated overnight. During this time, the gel was transformed into a thin suspension. Processing similar to that described in Example 1 yielded 8.299 g of the product.

Chromatographic analysis indicated that the product had a some species with several cyclodextrin moieties, but no truly polymeric fraction. Mass spectrum in FAB mode had the base peak at m/z 1670. The average molecular weight was 1669; gamma cyclodextrin was not detected. The cycle favoring ratio was calculated using species substituted (1) with three glycerol cyclic diether groups and one glycerol monoether group and (2) with two glycerol cyclic diether groups and two glycerol monoether groups) and was found to be 0.77.

EXAMPLE 6

Alkylation by epichlorohydrin of gamma-cyclodextrin in diluted aqueous solution of sodium hydroxide:

Condensation in which epichlorohydrin was added to a solution of gamma-cyclodextrin in aqueous sodium hydroxide (2.5%) at room temperature yielded product of Rf 0.19–0.47. FAB mass spectrum yielded a bimodal distribution with the most intensive peaks at m/z 1450 and at m/zl672, respectively. The cycle favoring ratio was calculated using species substituted with (1) three glycerol cyclic diether groups and with (2) two glycerol cyclic diether groups and one glycerol monoether group and was found to be 0.72.

EXAMPLE 7

Alkylation by epichlorohydrin of gamma-cyclodextrin in aqueous emulsion to which a solution of sodium hydroxide was slowly added:

With very reactive alkylating reagents, the basicity of the reaction mixture can be kept constant and at the minimal effective value using a simple device of adding the base at slower rate than it is consumed. This was accomplished in this example by a very slowly adding (three hours total) a solution of aqueous sodium hydroxide to a rapidly stirred emulsion of epichlorohydrin in aqueous solution of gamma-cyclodextrin (9%). Conditions were similar to those of Example 6. FAB mass spectrum in the molecular ion area had a monomodal distribution with the base peak at m/z 1855.

EXAMPLE 8

Alkylation by epichlorohydrin of gamma-cyclodextrin performed in presence of in situ formed hydroxides or in the presence of buffering salts:

In this preparation, epichlorohydrin was added to a gel formed from gamma-cyclodextrin, calcium chloride and sodium hydroxide in water; the product had Rf 0.18–0.47. FAB mass spectrum had a monomodal distribution with a base peak at m/z 1466. The ring favoring ratio was calculated using specie substituted with (1) three glycerol cyclic diether groups and one glycerol monoether group and (2) two glycerol cyclic diether groups and two glycerol monoether groups and was found to be 0.82.

Similar experiments were performed using aluminum chloride, zinc chloride, magnesium chloride or silicic acid in place of calcium chloride; the products were examined by thin layer chromatography and yielded patterns similar to those described in the previous example.

EXAMPLE 9

Alkylation by 1,2-dichloroethane of gamma-cyclodextrin in refluxing aqueous suspension of calcium hydroxide:

To a boiling stirred suspension of gamma-cyclodextrin (10 g, 55 mmoles of glucopyranosyl residue) and calcium hydroxide (8.214 g, 111 mmoles) in water (100 ml), 1,2-dichloroethane (8.8 ml, 111 mmoles) was added through a reflux condenser. Refluxing and stirring continued for 21 hours. The reaction mixture was filtered while hot (upon cooling a gel was formed) and processed in standard manner. The product was ground to a white powder (6.014 g). Chromatographic analysis indicated the presence of two main species—gamma-cyclodextrin of Rf 0.29 and compound of Rf 0.39. These species were obviously identical to those obtained in the reaction using the activator and described in Example 10.

EXAMPLE 10

Alkylation by gamma-cyclodextrin in refluxing aqueous suspension of calcium hydroxide with activator:

In an attempt to increase the substitution, the experiment in Example 9 was repeated, but potassium iodide (3.686g, 22 mmoles), which is an activator in alkylations by alkyl chlorides, was added. The stirring and refluxing lasted for a total of 53 hours; the processing (as in Example 1) yielded 5.025 g of a product.

Chromatographic analysis again indicated the presence of two main components, gamma-cyclodextrin with Rf 0.24 and a compound with Rf 0.34; additionally, five minor components were detected with the following Rf values: 0.11, 0.17, 0.28, 0.40 and 0.47.

Mass spectrum, measured in FAB mode, showed the presence of the following components: m/z 1298, 18%, (no substituent); m/z 1324, 12%, (one ethylene glycol cyclic diether group); m/z 1336, 13%, (one ethylene glycol monoether group); m/z 1350, 5%, (two ethylene glycol cyclic diether groups); m/z 1362, 8%, (one 2-chloroethyl ether group) and (one ethylene glycol cyclic diether group and one ethylene glycol monoether group); m/z 1390, 5%, (two ethylene glycol monoether groups); m/z 1432, 4%, (unidentified); m/z 1450, 19%, (one iodoethyl ether group); m/z 1476, 12%, (one ethylene glycol cyclic diether group and one iodoethyl ether group); m/z 1502, 3%, (two ethylene glycol diether groups and one iodoethyl ether group).

EXAMPLE 11

Alkylation by 1.2-dichloroethane of beta-cyclodextrin or of alpha-cyclodextrin in refluxing aqueous suspension of calcium hydroxide, with activator:

These cyclodextrins were derivatized in the same way as gamma-cyclodextrin in Example 10. Mass spectrum of the product of beta-cyclodextrin, measured in MALDI mode, had the following peaks: m/z 1160, 14%, (no substituent); m/z 1175, 11%, possibly $H^+$ ion of (one ethylene glycol monoether group); m/z 1186, 32%, (one ethylene glycol cyclic diether group); m/z 1213, 17%, (two ethylene glycol cyclic diether groups); m/z 1227, 15% (one chloroethyl ether group); m/z 1239, 6%, (three ethylene glycol cyclic diether groups); m/z 1252, 5%, (two ethylene glycol cyclic diether groups and one ethylene glycol monoether group).

Mass spectrum of the product obtained from alpha-cyclodextrin was measured in FAB mode and had the following peaks: m/z 974, 50%, (no substituent); m/z 1000, 18%, (one ethylene glycol cyclic diether group); m/z 1014, 9%, (one ethylene glycol monoether group); m/z 1066, 9%, (two ethylene glycol monoether groups); m/z 1106, 1106, 7%, (probably matrix), m/z 1198, 7%, (probably matrix).

EXAMPLE 12

Alkylation by 1,2-dichloroethane of gamma-cyclodextrin in overheated aqueous suspension of calcium hydroxide in pressure vessel:

Gamma-cyclodextrin (20 g, 111 mmoles of glucopyranosyl residue), water (200 ml), 1,2-dichloroethane (36 ml, 45.2 g, 457 mmoles), calcium hydroxide (17.6 g, 237 mmoles) and sodium borohydride (0.4 g, 10 mmoles) were placed into a stainless steel pressure vessel. The vessel was closed and placed into an oil bath heated to 110°–120° C. and the contents stirred by a magnetic stirrer for 24 hours. The reaction mixture was processed in a manner similar to that in Example 1, except that it was decolorized by active carbon; yield was 25.1 g of a nearly colorless powder.

The product was subjected to alditol acetate analysis with the following results: unsubstituted glucose 80%; glucose substituted with ethylene glycol cyclic diether group 13.5%, glucose substituted with ethylene glycol monoethers: on 0–2 3.1%, on 0–3 1.6%, on 0–6 0.6%. From these data, it can be calculated that 98% of all substitutions occurred on the secondary hydroxyls and that 75% of the intramolecular crosslinking possible occurred.

EXAMPLE 13

Alkylation by 1,2-dibromopropane of gamma-cyclodextrin in refluxing aqueous suspension of calcium hydroxide:

Gamma-cyclodextrin (10 g, 55 mmoles of glucopyranosyl residue) was condensed with 1,2-dibromopropane (11.6 ml, 111 mmoles) in the manner of Example 10, but no activator was used and the period of refluxing was 70 hours. The product was, after grinding, a white powder (2.547 g).

Chromatography analysis revealed the presence of three major components with Rf 0.17, 0.37, 0.44 and one minor one with Rf 0.54 in addition to gamma-cyclodextrin (Rf 0.29).

Mass spectrum, measured in MALDI mode, had the following peaks: m/z 1322, 43%, gamma-cyclodextrin (no substituent), m/z 1362, 33%, (one propylene glycol cyclic diether group); m/z 1379, 13%, (one propylene glycol monoether group); m/z 1440, 5%, (two propylene glycol cyclic diether groups), m/z 1439, 6%, (three propylene glycol cyclic diether groups and one bromo-propyl ether group).

This product was smoothly permethylated, after the dissolution in anhydrous dimethyl sulfoxide, by the sequential treatment with powdered sodium hydroxide and an excess of methyl iodide. After the decomposition of the reaction mixture by water the product was extracted into chloroform. The extracts, after drying and evaporation to dryness, yielded the product, a colorless glass.

EXAMPLE 14

Alkylation by 1 2-dichloroethane of alpha-cyclodextrin in organic solvent:

Alpha-cyclodextrin was dehydrated at 120° C. (measured directly in the substance) for about an hour. The dried alpha-cyclodextrin (1.8 g, 11 mmoles) was added to the anhydrous dimethylformamide (20 ml) and the suspension was refluxed and stirred. Calcium hydroxide (1.64 g, 22 mmoles) was then added, followed by 1,2-dichloroethane (3.5 ml, 48 mmoles). Refluxing and stirring were continued for 12 hours; the suspension was then filtered giving a brown colored solution. After the evaporation to dryness in vacuo, the residue was dissolved in a solution of water (20 ml) and acetic acid (2 ml). Active carbon and cellulose powder were added and the suspension was processed as in Example. Evaporation yielded a glassy residue, which was ground to a brown powder (0.495 g).

Chromatographic analysis revealed the presence of the same component as obtained when an aqueous medium was used. Additionally, there were several minor components with lower Rf values.

EXAMPLE 15

Alkylation by methyl iodide of gamma-cyclodextrin in refluxing aqueous suspension of calcium hydroxide:

Gamma cyclodextrin (10 g, 55 mmoles of glucopyranosyl residue) and calcium hydroxide (4.11 g, 55 mmoles) were added to water (100 ml) and the suspension was stirred and heated to reflux. Methyl iodide (6.9 ml, 111 mmoles) was added dropwise through the reflux condenser while heating was continued. Addition required an hour; refluxing and stirring continued for another two hours. The mixture was them left standing overnight. The processing of the mixture (as in Example 1) yielded 6.701 g of white material. Cyclodextrins substituted by alkyl substituents are known to be very well separated, according the number of substituents, by the chromatographic system used. Six components were distinctly detected—from the unsubstituted gamma-cyclodextrin to a pentamethyl species; respective Rf values were: 0.29, 0.35, 0.44, 0.52, 0.61, 0.70. The strongest spots were those of monomethyl and dimethyl gamma-cyclodextrins. The product was further subjected to alditol acetate analysis with the following results: unsubstituted glucose 77.1%, 2-O-methylglucose 19%, 3-O-methylglucose 4.6%, 6-O-methyl glucose 0.9%, 2,3-di-O-methylglucose 0.9%, 2,3,-O-dimethylglucose 0.2% and 2,6-O-dimethylglucose 0.6%. From these data, the average degree of substitution was calculated to be two methyl molecules and 96% of substituents to be on secondary hydroxyls.

Beta-cyclodextrin was methylated in a similar procedure in three experiments (a–c) in which the ratio of cyclodextrin and methylation agent was varied. The following results were obtained: unsubstituted glucose a-64%, b-28%, c-14%; 2-O-methylglucose a-21%, b-29%, c-29%; 3-O-methylglucose a-8%, b-16%, c-13%; 6-O-methylglucose a-3%, b-5%, c-6%; 2,3-O-dimethylglucose a-2%, b-12%, c-18%; 2,6-O-dimethylglucose a-15, b-5%, c-10%; 3,6-O-dimethylglucose a-0%, b-3%, c-4%; 2,3,6-O-trimethylglucose a-0%, b-2%, c-6%.

EXAMPLE 16

Alkylation by 3-chloro-2-methylpropene of gamma cyclodextrin in refluxing aqueous suspension of calcium hydroxide:

The same conditions as in Example 15 were used, but reflux was for 16 hours. The product contained, in addition to gamma-cyclodextrin, the monosubstituted and disubstituted derivatives

EXAMPLE 17

Alkylation by diethylaminoethyl chloride of gamma-cyclodextrin after gelling its aqueous solution with calcium hydroxide:

To a suspension of calcium hydroxide in water (30 ml) in a ball mill container, a hot aqueous solution (30 ml) of gamma-cyclodextrin (log, 111 mmoles of glucopyranosyl residue) was added. After a gel was formed, a solution of diethylaminoethyl chloride hydrochloride (15.65 g, 91 mmoles) in water (40 ml) and mill balls were added and the rotation started. After one hour of rotation, the gel liquefied; rotation continued for another 12 hours. The processing by filtration, dialysis and evaporation yielded 8.555 g of a slightly yellow glassy material.

Chromatographic analysis revealed that the product contained mainly components with Rf from 0 to 0.14 with minor ones extending up to 0.3.

Mass spectrum, measured in FAB mode, contained a large number of peaks, which after an analysis, revealed that the presence of the expected series of mono to undecaderivatives of gamma-cyclodextrins. Each of these components appeared in the mass spectrum as several species differing by the degree of neutralization. No peak for gamma-cyclodextrin was detected. From the many peaks observed, just the most prominent are given: m/z 1495, 6%, (two diethylaminoethyl groups); m/z 1595, 8%, (three diethylaminoethyl groups); m/z 1730, 9%, (four diethylaminoethyl groups and one chloride ion), m/z 1829, 16%, (five diethylaminoethyl groups and one chloride ion): m/z 1927, 12%, (six diethylaminoethyl groups and one chloride ion), m/z 2064, 14%, (seven diethylaminoethyl groups and two chloride ions), m/z 2162, 11%, (eight diethylaminoethyl groups and two chloride ions), m/z 2299, 11%, (nine diethylaminoethyl groups and three chloride ions); m/z 2434, 8%, (ten diethylaminoethyl groups and four chloride ions), m/z 2534, 5%, (eleven diethylaminoethyl groups and four chloride ions). The average degree of substitution calculated from these data is close to 6.5 substituents per molecule.

EXAMPLE 18

Alkylation by 1,3-propanesultone of gamma-cyclodextrin after gelling its aqueous solution with calcium hydroxide:

The experiment was performed as described in Example 17, but 1,3-propanesultone (11.087 g, 91 mmoles) was used instead of diethylaminoethyl chloride and, before the dialysis, sodium sulfate (19.88g, 140 mmoles) was added to help to exchange calcium ions for sodium ions. The product, a white powder after grinding, amounted to 10.856 g.

Chromatographic analysis showed that there was no gamma-cyclodextrin in the product, which had a continuous spot of Rf 0.03–0.28. Mass spectrum was measured in MALDI mode. No peak which can be attributed to gamma-cyclodextrin was present; the peaks recorded below correspond to the sodium ion of gamma-cyclodextrin substituted with an increasing number of $C_3H_6O_3SNa$ substituents, denoted below as sulfonates: m/z 1464, 8%, (one sulfonate group); m/z 1607, 11%, (two sulfonate groups), m/z 1751, 10%, (three sulfonate groups), m/z 1895, 24%, (four sulfonate groups), m/z 2039, 25%, (five sulfonate groups); m/z 2183, 13%, (six sulfonate groups); m/z 2327, 5%, (seven sulfonate groups), m/z 2471, 4%, (eight sulfonate groups). From these data, the average degree of substitution was calculated to be 4.5 per molecule.

EXAMPLE 19

Preparation of partially acetylated cyclodextrins by acetylation in aqueous suspension of calcium hydroxide or by hydrolysis of fully acetylated cyclodextrins by calcium hydroxide:

To a stirred solution of alpha-cyclodextrin (5 g, 27 mmoles of glucopyranosyl residue) in hot water (16 ml, calcium hydroxide (8.15 g, 110 mmoles) was added. The suspension was placed into an ice bath. After a stiff gel was formed, acetanhydride (12.2 ml, 110 mmoles) was added. The flask was then shaken vigorously. An exothermic reaction occurred in which the content of the flask was converted to a powdery solid. Ice was added to the flask. The powder dissolved and produced a solution having a pH 6. The solution was then extracted with chloroform (25 ml), dialyzed against cold water for two hours, treated with deionizing resin, filtered and evaporated. The resulting residue (6.04 g) was, by chromatographic analysis, shown to contain some alpha-cyclodextrin (Rf 0.33)and its partial acetates with low degree of substitution (Rf 0.41–0.65). Drying and evaporation of chloroform extracts yielded partial acetates of alpha-cyclodextrin with a higher degree of substitution (85 mg) of Rf 0.65–0.79. The fully acetylated cyclodextrins have Rf 0.85–0.9 and are easily hydrolyzed by action of calcium hydroxide.

EXAMPLE 20

Preparation of cyclodextrin derivatives with cyclic diether substitution by a two-step procedure:

A mixture of gamma-cyclodextrin derivatives (2 g) carrying 2-methylpropen-3-yl substituents prepared as described in Example 16 was added, while stirring, to trifluoroacetic acid (10 ml). After completion of dissolution, the solution was left standing for one day, evaporated to dryness in vacuo and then kept in a boiling water bath for several minutes. The residue was treated with concentrated aqueous ammonia (10 ml), evaporated to dryness again and dissolved in water. Small molecular weight components were removed by dialysis against water and the solution filtered and again evaporated to dryness. The product, after grinding, was a white powder (0.81 g). Chromatography analysis revealed that no starting components carrying 2-methylpropen-3-yl substituents were present. Their conversion, through intramolecular cyclization to a product containing fused 2,2-dimethyl-1,4- dioxane rings, may be assumed to have occurred.

EXAMPLE 21

Preparation of resins containing cyclodextrin derivatives with a rigidly extended cavity:

The water soluble derivative of beta-cyclodextrin containing glycerol cyclic diether groups (preparation of which was described in Example 2) was converted into a water insoluble resin as follows: To a stirred and heated (90° C.) solution of detergent (Triton X 100, about 0.5 g) in toluene, a solution of the cyclodextrin derivative (0.5 g) and sodium hydroxide (0.1 g) in warm water (1 ml) was added. Heating was continued for another hour. After cooling to room temperature, toluene was decanted from the product which adhered as a crust to the walls of the container. After the extensive washing of the crust with methanol, acetone and water and drying, a glassy solid (0.422 g) was obtained which could be easily disintegrated by a spatula into a powder.

EXAMPLE 22

Solubilization and stabilization of medicinals by cyclodextrin derivatives and the results establishing suitability of these derivatives for pharmaceutical uses:

A compound of low solubility in water is suspended in water or in an aqueous solution. Cyclodextrin derivative is added in about ten times the weight of the compound to be solubilized and the suspension or emulsion is agitated for several hours. Thereafter, the undissolved material is removed by filtration or centrifugation yielding a clear solution of a complex of cyclodextrin derivative.

The solubilization potency of the 10% aqueous solution of the cyclodextrin derivative (made by the process described in the Example 1 from beta-cyclodextrin and epichlorohydrin) was compared to that of a solution of hydroxypropyl beta-cyclodextrin of the same strength. The potency was expressed as a percentage, solubility in hydroxypropyl beta-cyclodextrin solution being equaled to 100%. The following results were obtained with a series of medicinals of limited water solubility: Budenoside (93%), domperidone (110%), furosemide (71%), hydrocortisone (61%), ibuprofen (160%), ketonazole (94%), piroxicam (86%), terfenadine (133%) and testosterone (42%). If the complexes of the above are desired in solid form, water can be removed by freeze drying.

The above derivative of cyclodextrin can also stabilize, through formation of inclusion complexes, aqueous solutions of peptides and proteins. These effects were evaluated in an experiment in which insulin in solution was left to spontaneously aggregate and precipitate. Without any protectant, only 45% of insulin remained in non-aggregated and water soluble form. Addition of 5% (wt/wt) of the derivatives made according to Example 1 from alpha-cyclodextrin increased this percentage to 97%, from beta-cyclodextrin to 96% and from gamma-cyclodextrin to 82%. These results are superior to those obtained with hydroxypropyl alpha-cyclodextrins (68%), with hydroxypropyl beta-cyclodextrin (84%), and with hydroxypropyl gamma-cyclodextrin (66%). The above-mentioned solutions made from products prepared by methods of Example 1, did not cause irritation to skin, eye or upon subcutaneous injection.

Products of this invention were also tested for toxicity in mice, after an intraperitoneal injection. The product made by the condensation of epichlorohydrin and beta-cyclodextrin was without toxic effect at a dose 10 g per kg. The methylation product of beta-cyclodextrin, at a dose of 5 g per kg, resulted in a death of one mouse from the four injected.

Solubilization and stabilization of poorly water soluble substances of technical interest can be achieved in a similar manner. Absorption of lipophilic substances from aqueous solution by water-insoluble cyclodextrin resins can be accomplished by a simple filtration through a layer of resin.

What is claimed is:

1. A composition of matter comprising alpha, beta or gamma cyclodextrins or mixtures thereof which are selectively partially methylated in which 65% to 96% of the total methyl groups replacing the hydrogens replace hydrogens at the secondary hydroxyl positions on the cyclodextrins.

2. A composition of matter of claim 1 comprising alpha, beta or gamma cyclodextrins or mixtures thereof which are selectively partially methylated in which 65% to 96% of the total methyl groups replacing the hydrogens replace hydrogens at the secondary hydroxyl positions on the cyclodextrins and an active agent which is insoluble to sparingly soluble in water or a water-soluble solvent.

3. A composition of claim 2 which is a pharmaceutical composition.

4. A method of producing alkylated cyclodextrins comprising the steps of:
   (1) mixing a cyclodextrin and an alkylating reagent which is capable of liberating a strong acid in water, and
   (2) gradually adding base to the composition obtained in step (1) so that the pH does not rise above 13.5.

5. A method of claim 4 wherein the alkylating agent has two alkylating moieties per molecule.

6. A method of claim 4 wherein the alkylating agent has one alkylating moiety per molecule.

7. A method of claim 4 wherein sodium hydroxide is used as a base.

8. A method of claim 5 wherein the alkylating agent is chosen from among epichlorohydrin and vicinal dihalide.

9. A composition of matter comprising a cyclodextrin, an alkylating agent, and at least one reagent chosen from among calcium hydroxide, magnesium hydroxide, a salt of calcium or magnesium, a silicate, a zincate, or an aluminate.

10. A method of producing alkylated cyclodextrins comprising the steps of:
    (1) mixing a cyclodextrin with a base which is only sparingly soluble to insoluble in water,
    (2) adding an alkylating agent which is capable of liberating a strong acid to the mixture obtained in step (1), and
    (3) agitating the product obtained in step (2).

11. A method of claim 10 wherein the base used is calcium hydroxide.

12. A method of claim 10 wherein the base used is magnesium hydroxide.

13. A method of claim 10 wherein the reaction mixture is heated during or before the agitation.

14. A method of claim 4 wherein the cyclodextrin and alkylating agent are mixed with at least one alkaline salt before the gradual addition of base.

15. A method of claim 14 wherein the salt is calcium or magnesium salt.

16. A method of 14 wherein the salt is chosen from among aluminates, silicates or zincates.

17. A method of claim 10 wherein the agitation is performed in a ball mill.

18. A method of producing alkylated cyclodextrins comprising the steps of:
    (1) mixing a cyclodextrin in solution with at least one base selected from among calcium hydroxide, magnesium hydroxide, a salt of calcium or magnesium, a silicate, a zincate, or an aluminate,
    (2) adding an alkylating agent to the mixture obtained in step (1) and
    (3) agitating the product obtained in step (2).

19. A method of claim 18 wherein the alkylating agent is ethylene oxide or propylene oxide.

* * * * *